INVENTOR
PAUL BOUTELANT
BY: Paul M. Craig, Jr.
ATTORNEY

United States Patent Office 3,287,667
Patented Nov. 22, 1966

3,287,667
LOW ATTENUATION VERY HIGH FREQUENCY TIME DELAY VS. FREQUENCY VARIATION CORRECTING NETWORK

Paul Boutelant, Bobigny, France, assignor to Compagnie Generale d'Electricite, Paris, France Filed Jan. 29, 1964, Ser. No. 340,884
Claims priority, application France, Jan. 31, 1963, 923,294
12 Claims. (Cl. 333—28)

The present invention relates to a transmission system for electrical signals, and more particularly to a transmission system for electrical signals which comprises a phase shift network with relatively small attenuation.

The present invention has for its object a transmission system for very high or ultra-high frequency electrical signals, comprising a phase-shift network producing a delay varying with the frequency of the signals according to a predetermined law.

This network may, in particular, serve as correcting device to compensate the inequalities of propagation time introduced by other elements of a transmission system.

It is known that, in the transmission systems of high-frequency electric waves, certain elements such as, for example, bandpass filters, produce a distortion of the shape of the transmitted wave, because the propagation time thereof is not constant within the entire band of useful frequencies. This effect is particularly harmful in the transmission systems which use frequency modulation.

To remedy this inconvenience, it is known in the prior art to associate with such elements an equalizing network of which the variation of propagation time is complementary to that of the said elements, in such a manner as to obtain a substantially constant global propagation time. It goes without saying that such networks must be constructed in such a manner as to produce only as reduced as possible an attenuation.

According to a technique transposing in the field of ultra-short waves the phase-shift networks employing a differential transformer associated with two reactances of a value depending on the frequency, it is known to realize such an equalizer device by means of two reactive impedances connected to two of the four terminals or branches of a differential coupler, generally of the type known under the name of "Magic-T" of which the other branches or terminals constitute, respectively, the input and the output of the said network.

It is also known to utilize, in lieu of the "Magic-T" a device well known to persons skilled in the art under the name of "circulator" which permits to obtain the same result as the one mentioned above by means of a single reactive impedance in the place of two impedances, whereby the "circulator" may include three or four terminals or branches connected to coaxial cable portions or wave-guide portions.

The present invention has as its object a transmission system of electrical signals, established to function within a certain band of frequencies, and constituted by a circulator having two branches or inputs connected, respectively, to the input line and to the output line of the said signals, and at least one other branch or terminal connected to at least one circuit with a reactive impedance having a resonant frequency comprised within the said band of frequencies.

In the following text, the central frequency of the aforementioned band of frequencies will be designated by $F_0$.

In a particular form of construction according to the present invention, at least one of the reactive impedances is constituted by the input impedance of a band filter formed by a wave-guide along which are coupled, at a spacing substantially equal to an integer number of half wave-lengths of the wave transmitted within this guide, resonant cavities tuned substantially to the frequency $f_0$, the said wave-guides being closed, at the output end thereof, by a resonant cavity also tuned substantially to the frequency $f_0$.

The aforementioned spacings may also be equal to an odd integer number of quarter wave-lengths of the wave transmitted, but then the law of variation of the delay with frequency differs from that which is obtained in the preceding case.

According to one simple embodiment of the present invention, the circulator is formed by a Y-connection within the central portion of which is inserted a piece of ferromagnetic material submitted to a permanent magnetic field of polarization.

Finally, at least one of the reactive impedances may be constituted by the input impedance of one of the terminals or branches of a switching device formed by a Y junction of which the other two branches or terminals are closed by resonant cavities having resonant frequencies respectively equal to $f_1$ and $f_2$, the said frequencies $f_1$ and $f_2$ being, respectively, lower and higher than $f_0$.

Accordingly, it is an object of the present invention to provide a transmission system for electrical signals of the type described hereinabove which avoids by extremely simple and operationally effective means the shortcomings and drawbacks encountered with the prior art constructions.

Another object of the present invention resides in the provision of a transmission system of electrical signals provided with a phase-shift network that produces a delay varying with the frequency of the signals according to a predetermined law yet considerably reduces the attenuation in the network.

Still another object of the present invention resides in the provision of a transmission system for electrical signals, especially for frequency-modulated electrical signals which compensates in a completely satisfactory manner distortions of the signals within a given band of frequencies.

A further object of the present invention resides in the provision of an electrical signal transmission system which is simple in construction, utilizes relatively few parts, is easy to assemble and adjust in operation and assures the aims and objects mentioned hereinabove.

These and other objects, features, and advantages of the present invention will become more obvious from the following description when taken in connection with the accompanying drawing which shows, for purposes of illustration only, several embodiments in accordance with the present invention, and wherein.

Figure 1:
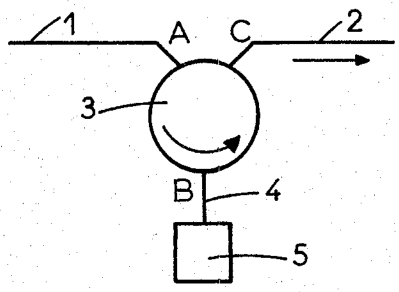
FIGURE 1 is a schematic diagram of a first embodiment of a network in accordance with the present invention in its most general form.

Referring now to the drawing wherein like reference numerals are used throughout the various views to designate like parts, and more particularly to FIGURE 1 which is a schematic view of a network in its most general form, reference numeral 1 designates in this figure the schematically indicated input wave-guide, connected to the terminal or branch A of a conventional circulator 3.

Reference numeral 2 designates in this figure the output wave-guide connected to terminal or branch C of the circulator 3, and reference numeral 5 designates a reactive circuit connected by way of wave-guide portion 4 to the terminal or branch B of the circulator 3.

The reactive circuit 5 may be constituted, in particular, by a resonant cavity coupled to the extremity of the connecting wave-guide portion 4 opposite the terminal or branch B by any known means, for example, by an iris, a slot, or a coupling aperture.

If one designates by $f$ the frequency of a wave comprised within the useful band of frequencies, of which the central frequency is $f_o$, and by $x$ the quantity $$\left(\frac{f}{f_o}-\frac{f_o}{f}\right)$$

one may readily demonstrate that the delay line time $t$ introduced by the reflection of the wave from the termination 5 of the wave-guide 4 is substantially equal to:

$$t=\frac{2}{\pi Df}\cdot\frac{1}{1+\frac{x^2}{D^2}} \quad (1)$$

where "D" is a coefficient depending on the degree of coupling between the cavity 5 and the wave-guide portion. The delay time proper of the wave-guide portion 4 is practically negligible if this portion is very short.

The Equation 1 shows that the delay time $t$ varies symmetrically with the frequency on both sides of $f_o$, and that, by the choice of the value of the coefficient D, one may act on the magnitude of $t$ and on the rapidity of the variation thereof with the frequency. In the present case, $t$ is maximum for the frequency $f_o$ and diminishes on both sides of this frequency which is useful if one desires to compensate the delay variations of certain types of filters, for example, the band-pass filters with so-called double-humped, more or less flat characteristics; for the delay time proper of these latter types of filters is, in contrast, minimum for the middle frequency thereof and increases on both sides of the latter, then attains a maximum for a certain value of frequency deviation $(f-f_o)$ and diminishes again when the magnitude of this deviation continues to increase.

Figure 2:
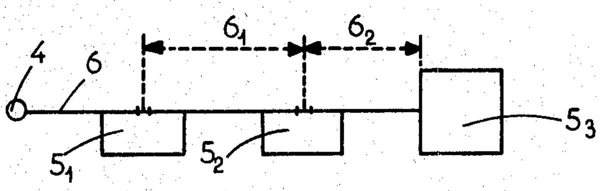
FIGURE 2 is a schematic diagram of a modified reactive element in accordance with the present invention for use with the network of FIGURE 1.

If one wishes to obtain a more rapid variation of the delay time $t$ when the frequency deviation $(f-f_o)$ increases, this deviation being substantially equal to $\frac{1}{2}f_o x$, one may, with the arrangement according to FIGURE 1, substitute for the element 5 a more complex device, as shown in FIGURE 2.

The device according to FIGURE 2 is constituted by a band-pass filter formed by two or more spaced resonant cavities such as cavities $5_1$, $5_2$ coupled along the wave-guide 6 which is formed by a series of wave-guide portions such as portions $6_1$, $6_2$, with the last of the wave-guide portions terminated by a resonant cavity $5_3$. All of the cavities $5_1$, $5_2$, $5_3$ are tuned to the frequency $f_o$ and present appropriate coupling degrees with the wave-guide 6.

If one desires to obtain a delay time presenting a single maximum for the frequency $f_o$, one gives the wave-guide portion $6_1$, $6_2$ a length $k\lambda_g/2$, where $\lambda_g$ designates the phase wave-length between the wave-guide portions $6_1$ and $6_2$, and $k$ is an integer number.

If one desires to obtain, in contradistinction, a delay time having a minimum for the frequency $f_o$ and two symmetrical maxima on both sides of the latter, one gives to the wave-guide portions $6_1$ and $6_2$ a length $$\frac{(2k+1)\lambda_g}{4}$$

$k$ still designating an integer number.

Referring to the first case, in which the wave-guide portions $6_1$ and $6_2$ have multiple lengths of the half wave-length, and supporting that the coefficients expressing the coupling degree with the wave-guide 6 have the same value D for all the cavities, one has, for a number $n$ of cavities, a delay time $$T=\frac{2n}{\pi Df_o}\cdot\frac{1}{1+\frac{n^2x^2}{D^2}}$$

As an illustrative example, one may indicate that with two suitably coupled cavities, one may obtain for $f_o$=4170 mc./s. (megacycles per seconds) and for a frequency deviation of ±15 mc./s., a delay time deviation of 54.6 millimicroseconds with respect to the delay measured at the frequency $f_o$.

This result corresponds to the case in which, proper consideration being given to the coupling degree thereof with the wave-guide 6, the cavities have an external Q factor—that, is a factor of quality of which the value takes into consideration the load constituted by the characteristic impedance of the guide—equal to 200. The attenuation produced by the assembly of the phase-shift network is especially due to the unidirectional elements (gyromagnetic materials such as ferrites) of the circulator, and is of the order of some tenths of decibel.

If one considers, in contract, the second case in which the wave-guide portions $6_1$ and $6_2$ have multiple odd integer lengths of a quarter wave-length, the delay time $t$ is represented by a more complicated rational function, in which the polynomial of $x$ intervene in the numerator and in the denominator. The choice of $n$ and of the coefficients such as D still permits the adjustment of the magnitude of the delay $t$ and its law of variation with the frequency, in particular the values of $(f-f_o)$ for which this delay is maximum. Nevertheless, in the latter case, the structures according to FIGURE 2 exhibit the property of having for the frequencies located in the vicinity of the center of the transmitted band, a propagation time which is not zero and is even relatively large which may constitute an inconvenience in certain cases.

Figures 3, 4, 5:
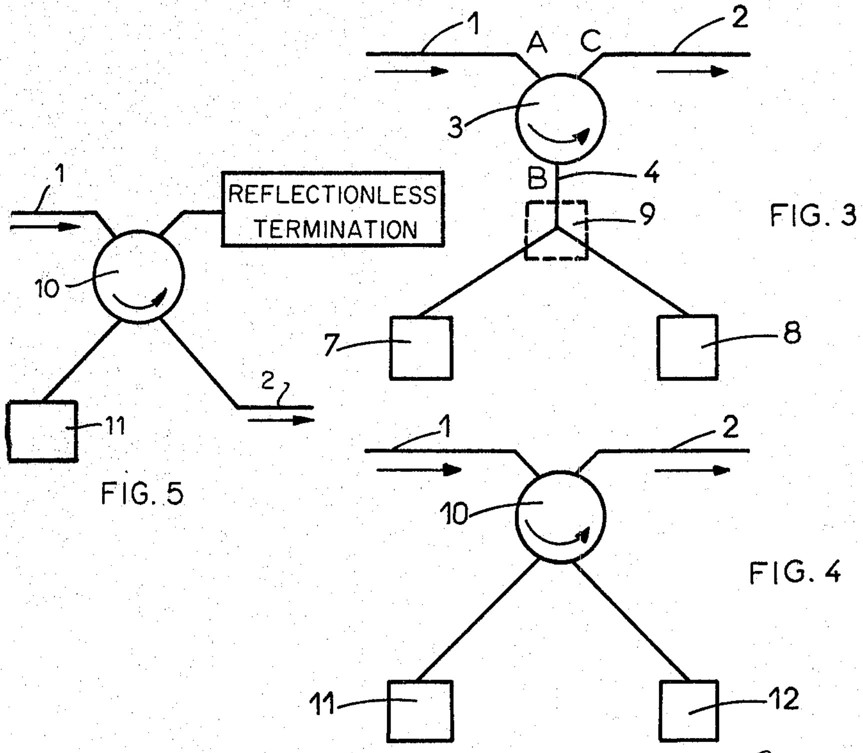
FIGURE 3 is a schematic diagram of a still further modified embodiment of a network in accordance with the present invention.
FIGURE 4 is a schematic diagram of still another modified embodiment of a network in accordance with the present invention; and thereafter
FIGURE 5 is a schematic diagram of still another modified embodiment of the present invention.

To avoid this inconvenience, one may, according to the present invention, utilize for realizing the reactive circuit 5, a structure such as shown in FIGURE 3, and which comprises two resonant cavities 7 and 8, respectively tuned to the frequencies $f_1$ and $f_2$, selected on both sides of $f_o$ and connected to the circulator 3 by a Y-connection 9.

In the device of FIGURE 3, the reactive circuit 5 according to FIGURE 1 is replaced by the assembly of elements 7, 8, 9. According to the well known properties of Y-connections, there exists in each of the three legs or branches of the latter a reference plane, often called "anti-principal plane" such that if one establishes a short-circuit, for a given frequency, in one of these planes, one obtains in the second plane an apparent impedance equal to that which exists in the third branch at the level of the reference plane corresponding to this latter. Thus, in the present case, if one supposes that the resonant cavity 7 realizes a short-circuit of the corresponding branch at the frequency $f_1$ lower than $f_o$, one obtains in the branch of the Y-connection connected to the wave-guide portion 4 an impedance equal to that of the cavity 8, assumed to be connected at the level of the anti-principal plane of the Y-connection 9 to which the same is connected. This impedance will be, for example, for the frequency $f_1$, a positive reactance since $f_2$ is larger than $f_1$. Inversely, for the frequency $f_2$, one will obtain in the branch of the Y-connection 9 connected to the wave-guide portion 4 a negative reactance since it will be the impedance presented by cavity 7, assumed to be connected at the level of the anti-principal plane of the branch of the Y-connection 9 to which it is connected. Between $F_1$ and $f_2$ the reactance will vary in a continuous fashion with the frequency $f$ and will pass through zero for the middle frequency $f_o$ if the frequencies $f_1$ and $f_2$ and the coupling coefficients of the cavities 7 and 8 are suitably chosen. The phase-shift introduced into the assembly of the system by the elements 7, 8, and 9 is, therefore, zero for $f=f_o$ and the delay time introduced will be reduced, for the said frequency, to the to and fro propagation time within the wave-guide portion 4, a time which is very small.

One may also utilize, in an analogous design, a structure such as shown in FIGURE 4, which comprises a circular 10 with four terminals or branches, the input and output wave-guides 1 and 2 being connected, respectively, to two of the inputs or terminals of the circulator 10 whereas the two cavities 11 and 12 are connected to two other terminals or branches thereof. If the resonant frequencies of the two cavities 11 and 12 are respectively $f_1$ and $f_2$, this structure permits to obtain a delay-time curve presenting, for the said frequencies, two maxima, in general of unequal amplitude, but which may be rendered of equal amplitude by a suitable choice of $f_1$ and $f_2$ and of the coupling coefficients of the corresponding cavities to the wave-guide portions which connect the same, respectively, to the circulator 10.

One could also, in a case illustrated in FIGURE 5 of the drawing attached hereto, utilize for example a circulator having four terminals or inputs with a single resonant cavity which, if desired, could be replaced by the device 7, 8, 9 of FIGURE 3 or by that of FIGURE 2. If one assumes that in such an arrangement the first input or branch is connected to the input wave-guide, the second input or branch is connected to the resonant cavity or to any reactive circuit replacing the same, and that the third input or branch is connected to the output wave-guide, the fourth input or branch of the circulator would have to be closed by a reflectionless termination, in order to avoid any return of energy toward the first input.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A transmission system for transmitting electrical signals within a band of frequencies having a central frequency $f_o$, comprising:

an input line for said signals, an output line for said signals, and phase-shift network means operatively connecting said input line with said output line and including circulator means having a plurality of branch connections and at least one circuit with a reactive impedance operatively connected with at least one of said branch connections, said reactive impedance having a resonant frequency within said frequency band, said reactive impedance circuit being constituted by a band-pass filter formed by a wave-guide connected at one end thereof to said circulator means and a plurality of resonant cavity means coupled to said wave-guide means at predetermined spacings along said wave-guide means, and further cavity means operatively connected to the end of said wave-guide means opposite the said one end thereof, said cavity means being tuned substantially to the frequency $f_o$, said spacings being equal to an integer number of half-wave lengths within said wave-guide means.

2. A transmission system for transmitting electrical signals within a band of frequencies having a central frequency $f_o$, comprising:

an input line for said signals, an output line for said signals, and phase-shift network means operatively connecting said input line with said output line and including circulator means having a plurality of branch connections and at least one circuit with a reactive impedance operatively connected with at least one of said branch connections, said reactive impedance having a resonant frequency within said frequency band, said reactive impedance circuit being constituted by a band-pass filter formed by a wave-guide connected at one end thereof to said circulator means and a plurality of resonant cavity means coupled to said wave-guide means at predetermined spacings along said wave-guide means, and further cavity means operatively connected to the end of said wave-guide means opposite the said one end thereof, said cavity means being tuned substantially to the frequency $f_o$, said spacings being equal to an integer odd number of quarter-wave lengths within said wave-guide means.

3. A transmission system for transmitting electrical signals within a band of frequencies having a central frequency $f_o$, comprising:

an input line for said signals, an output line for said signals, and phase-shift network means operatively connecting said input line with said output line and including circulator means having a plurality of branch connections and at least one circuit with a reactive impedance operatively connected with at least one of said branch connections, said reactive impedance having a resonant frequency within said frequency band, said reactive impedance circuit being constituted by a band-pass filter formed by a wave-guide connected at one end thereof to said circulator means and a plurality of resonant cavity means coupled to said wave-guide means at predetermined spacings along said wave-guide means, and further cavity means operatively connected to the end of said wave-guide means opposite the said one end thereof, said cavity means being tuned substantially to the frequency $f_o$.

4. A transmission system for transmitting electrical signals within a band of frequencies having a central frequency $f_o$, comprising:

an input line for said signals, an output line for said signals, and phase-shift network means including circulator means having a plurality of connections and reactive impedance means, said input and output lines being operatively connected, respectively, to two connections of said circulator means, said reactive impedance means including a Y-connection, the input of said Y-connection being operatively connected to a further connection of said circulator means, and two resonant cavity means tuned, respectively, to the frequencies $f_1$ and $f_2$ and operatively connected to the two outputs of the Y-connection, $f_1$ and $f_2$ being different from one another and different from $f_o$.

5. In a system for the transmission of electrical signals within a band of frequencies having a central frequency $f_o$, an input line and an output line for the said signals, and a phase-shift network connected between said input line and said output line, said phase-shift network comprising a plurality of reactive impedance means with low losses and having a resonant frequency within the said band of frequencies and circulator means with $n$ branches of rank, respectively, 1 to $n$, operable in such a manner that the transmission of the signals is possible only undirectionally from each branch toward the branch of the immediately next-higher rank of said circulator, the said input and output lines being, respectively, connected to the branches of the circulator means of rank 1 and $m$ being lower than $n$, whereas the branches of said circulator means of rank comprised between 1 and $(m-1)$ are each connected to one different one of the said reactive impedance means, and at least the branch of the circulator means of rank $(m+1)$ being connected to a reflectionless termination impedance.

6. A system according to claim 5, wherein said lines are wave guides and wherein said reactive impedance means include one resonant cavity means.

7. A system according to claim 6, wherein one of said resonant cavity means has a resonant frequency substantially equal to $f_o$.

8. A system according to claim 6, including at least two resonant cavity means having respective resonant frequencies $f_1$ and $f_2$ disposed, respectively, on both sides of $f_o$, said resonant cavities constituting two of said reactive impedance means respectively connected to two of said branches of rank comprised between 1 and $m$.

9. A system according to claim 5, wherein at least one of said reactive impedance means is constituted by the input impedance of a bandpass filter formed by a wave-guide along which are coupled, at spacings substantially equal to an integer number of half wave-lengths within the last wave-guide, resonant cavities tuned substantially to the frequency $f_o$ while said last-mentioned wave-guide is connected, at the extremity thereof opposite to that of the input, to a resonant cavity also tuned substantially to the frequency $f_o$.

10. A system according to claim 5, wherein at least one of the reactive impedance means is constituted by the input impedance of a bandpass filter formed by a wave-guide along which are coupled, at spacings substantially equal to an odd integer number of quarter wave-lengths within said guide, resonant cavities tuned substantially to the frequency $f_o$ while said guide is connected, at the extremity thereof opposite to the input, to a cavity also tuned substantially to the frequency $f_o$.

11. A system according to claim 5, in which at least one of said reactive impedance means is formed by the input impedance, at one of the inputs thereof, of a device constituted by a Y-connection whose other two inputs are connected to resonant cavities having resonant frequencies respectively equal to $f_1$ and $f_2$, $f_1$ and $f_2$ being different from one another and different from $f_o$.

12. In a system for the transmission of electrical signals within a band of frequencies having a central frequency $f_o$, an input line and an output line for the said signals, and a phase-shift network connected between said input line and said output line, said phase-shift network comprising a plurality in number $m$ of reactive impedance means and each having a resonant frequency within the said band of frequencies, circulator means with $n$ inputs of rank, respectively, 1 to $n$, $n$ being larger than $m$, and means operatively connecting said circulator means with said input and output lines and with said reactive impedance means in such a manner that the transmission of the signals is possible only unidirectionally from each input to the input of the immediately next-higher rank of said circulator means, the said input and output lines being respectively connected to the inputs of the circulator means of ranks 1 and $n$ whereas the inputs of rank comprised between 1 and $m$ are each connected to one of the said reactive impedance means.

References Cited by the Examiner

UNITED STATES PATENTS 3,149,292 9/1964 Gamble et al. -------- 332—5

HERMAN KARL SAALBACH, *Primary Examiner.*

R. D. COHN, *Assistant Examiner.*